(12) United States Patent
Meyer et al.

(10) Patent No.: US 8,389,617 B2
(45) Date of Patent: Mar. 5, 2013

(54) SILICAS

(75) Inventors: Juergen Meyer, Stockstadt (DE); Mario Scholz, Gruendau (DE)

(73) Assignee: Evonik Degussa GmbH, Essen (DE)

( * ) Notice: Subject to any disclaimer, the term of this patent is extended or adjusted under 35 U.S.C. 154(b) by 479 days.

(21) Appl. No.: 12/531,887

(22) PCT Filed: May 6, 2008

(86) PCT No.: PCT/EP2008/055551
§ 371 (c)(1),
(2), (4) Date: Sep. 18, 2009

(87) PCT Pub. No.: WO2008/141921
PCT Pub. Date: Nov. 27, 2008

(65) Prior Publication Data
US 2010/0105818 A1    Apr. 29, 2010

(30) Foreign Application Priority Data
May 22, 2007 (DE) .......................... 10 2007 024 097

(51) Int. Cl.
C01B 33/00 (2006.01)
C01B 33/113 (2006.01)
C01B 33/18 (2006.01)
C08K 3/36 (2006.01)
C08K 5/5419 (2006.01)

(52) U.S. Cl. ........ 524/493; 423/324; 423/325; 423/337; 524/267; 524/491; 524/847; 556/443; 556/450; 556/460; 556/465

(58) Field of Classification Search ............... 423/324, 423/325, 337; 524/267, 492, 493, 847; 556/443, 556/450, 460, 465
See application file for complete search history.

(56) References Cited

U.S. PATENT DOCUMENTS

| | | | |
|---|---|---|---|
| 2,803,617 | A | 8/1957 | Corrin |
| 2,928,009 | A | 3/1960 | Powell |
| 3,868,345 | A | 2/1975 | Kratel et al. |
| 3,920,865 | A | 11/1975 | Laeufer et al. |
| 4,307,023 | A * | 12/1981 | Ettlinger et al. ............. 524/268 |
| 6,316,050 | B1 | 11/2001 | Troll et al. |
| 2001/0016202 | A1 | 8/2001 | Kanemaru et al. |
| 2003/0103890 | A1 * | 6/2003 | Konya et al. ................. 423/335 |
| 2005/0244642 | A1 | 11/2005 | Meyer et al. |
| 2006/0115405 | A1 | 6/2006 | Konya et al. |
| 2007/0191537 | A1 | 8/2007 | Meyer et al. |

FOREIGN PATENT DOCUMENTS

| | | |
|---|---|---|
| DE | 10 2004 010 756 | 9/2005 |
| EP | 0 637 616 | 2/1995 |
| EP | 637616 A1 * | 2/1995 |
| EP | 1 116 753 | 7/2001 |
| EP | 1 316 589 | 6/2003 |
| GB | 1 420 345 | 1/1976 |
| WO | 2004 020532 | 3/2004 |

* cited by examiner

Primary Examiner — Ling Choi
Assistant Examiner — Darcy D Laclair Lynx
(74) Attorney, Agent, or Firm — Oblon, Spivak, McClelland, Maier & Neustadt, L.L.P.

(57) ABSTRACT

The invention provides structurally modified, pyrogenically prepared silicas obtained by reaction of pyrogenic silicas with cyclic polysiloxanes of the type $-[O-Si(R_2)]_n-$, where R is a C1 to C6 alkyl group and n is 3 to 9, and subsequent structural modification of the silanized silicas obtained. The invention further provides an adhesive comprising the structurally modified, pyrogenically prepared silicas.

20 Claims, No Drawings

SILICAS

The invention provides structurally modified (fumed) pyrogenic silicas silanized with cyclic polysiloxanes. The invention further provides adhesives comprising these silicas.

Silanized silicas are known from the prior art. They are described, for example, in DE 102 39 424 A1 or in DE 10 2004 010 756 A1.

Also known from the prior art is the treatment of finely divided oxides with cyclic polysiloxanes such as octamethylcyclotetrasiloxane (GB-A 887,257, GB-A 932,753, U.S. Pat. No. 2,803,617 A).

The processes known to date possess the disadvantage that the cyclic polysiloxanes are not completely attached to the surface of the oxides. Furthermore, the silicas described in the prior art are not structurally modified.

It is a first object of the invention, therefore, to provide structurally modified, silanized silicas which when silanized with cyclic polysiloxane bind the silyl groups as completely as possible to the surface of the silica.

Furthermore, the silanized silicas described are additionally structurally modified. These structurally modified silicas have the advantage over conventional silicas that they can be incorporated more effectively into adhesives and therefore contribute to improving the rheological properties of adhesives.

It is a further technical object of the invention, therefore, to provide a structurally modified, pyrogenically prepared, silanized silica which can be incorporated in fairly large amounts into adhesives, for the purpose of improving the rheological properties, without thickening of the adhesive occurring, the adhesive also remaining processable thereafter.

The technical object of the invention is achieved by means of a structurally modified, pyrogenically prepared silica which is obtained by reaction of pyrogenic silicas with cyclic polysiloxanes of type $-[O-Si(R_2)]_n-$, where R is a C1 to C6 alkyl group and n is 3 to 9, and subsequent structural modification of the silanized silicas obtained.

In one preferred embodiment the cyclic polysiloxanes of the type $-[O-Si(R_2)]_n-$ are characterized in that n in the general formula is 3, 4 or 5. With particular preference R is a methyl or ethyl group and n is 3, 4 or 5. Polysiloxanes used with great preference are those in which n is 3, 4 or 5 and R is a methyl group. Very particular preference is given to using octamethylcyclotetrasiloxane (D4).

In a further preferred embodiment the ratio of dimethylsilyl groups to monomethylsilyl groups on the surface of the silanized silicas is 100:0 to 50:50, preferably 100:0 to 70:30.

The surface modification can be carried out by spraying the silicas first, where appropriate, with water and subsequently with the surface modifier. The spraying can also take place in the opposite order or with water and surface modifier simultaneously. The water used may have been acidified with an acid, hydrochloric acid for example, to a pH of 1 to 6. The water used may have been alkalified with a base, ammonia for example, to a pH of 8 to 14. If two or more surface modifiers are used they can be applied separately in succession or simultaneously as a mixture.

The surface modifier or modifiers may be in solution in suitable solvents. When spraying is at an end, mixing may continue for 5 to 30 minutes more.

After the end of the subsequent mixing it is possible to insert an ageing period.

The mixture is subsequently treated thermally at a temperature of 20 to 600° C. over a period of 0.1 to 6 hours. The thermal treatment may take place under inert gas, such as nitrogen, for example.

The temperature treatment may also take place in a plurality of stages at different temperatures. The surface modifier or modifiers can be applied using single-fluid, dual-fluid or ultrasonic nozzles.

The surface modification can be carried out continuously or batchwise in heatable mixers and dryers with spraying devices. Suitable apparatus may be, for example, ploughshare mixers, plate dryers, fluidized-bed dryers or fluid-bed dryers.

As silicas it is possible to use all pyrogenically prepared silicon dioxides. Pyrogenically prepared silicon dioxides (fumed silicas) are known from Ullmann's Encyklopädie der technischen Chemie, 4th edition, volume 21, page 462. Preferably the silicas according to Table 1 can be used not only in the deacidified form but also in the non-deacidified form.

The silicas of the invention preferably possess a ratio of dimethylsilyl groups to monomethylsilyl groups of 100:0 to 50:50, more preferably 100:0 to 70:30.

The ratio of dimethylsilyl groups to monomethylsilyl groups is determined by means of Si-29 solid-state NMR spectroscopy.

Significant for the adjustment of the ratio of dimethylsilyl groups to monomethylsilyl groups is the temperature regime during the hydrophobing step.

In the treatment of pyrogenic silica having a hydrophilic surface area of 200 m$^2$/g at temperatures of 350° C. to 450° C., products with 100% dimethylsilyl groups on the silica surface are obtained. If the temperature is raised to 550° C. to 600° C., then the monomethylsilyl fraction increases to approximately 30%. The ratio of dimethylsilyl groups to monomethylsilyl groups is therefore 70:30.

The silicas can be prepared by using, as starting materials, pyrogenically prepared silicas obtained by thermal decomposition of volatile compounds of silicon in a vapour state in the presence of vapours or gases which have a hydrolyzing and/or oxidizing action. These silicas possess free OH groups on their surface, which are reacted with suitable hydrophobing agents. This is done in a fluidized bed until they have a ratio of dimethylsilyl to monomethylsilyl groups of 100:0 to 50:50, preferably 100:0 to 70:30; immediately following its preparation, the silica, which is still acidic, is mixed with maximum homogeneity with a pre-vaporized hydrophobing agent and is treated in a fluidized bed in the absence of oxygen, together with small amounts of water vapour and, where appropriate, with an inert gas, in continuous operation at temperatures from about 200 to about 800° C., preferably about 400 to about 600° C. Subsequently the solid reaction products are, where appropriate, deacidified and dried; judiciously, contact with oxygen is avoided before cooling has taken place to below about 200° C. The hydrophobing agents used are non-halogenated, catenated siloxanes, monocyclic methyl-dimethyl-cyclosiloxane mixtures D3 to D9, preferably octamethylcyclotetrasiloxane (D4).

The polydimethylcyclosiloxanes D3 to D9 are known compounds of the general empirical formula $-[(CH_3)_2SiO]_n$, where n can be 3 to 9. This nomenclature is set out in Ullmanns Encyclopädie der technischen Chemie (1982), volume 21, page 515 and also in W. Noll, Chemie and Technologie der Silicone (1968), Verlag Chemie, page 237.

As hydrophilic starting materials it is preferred to use silicas prepared pyrogenically, by means of flame hydrolysis from SiCl$_4$, and having a BET surface area of 20 to 400 m$^2$/g, preferably 50 to 380 m$^2$/g. Where appropriate these silicas can be steam-treated in a dewatering process.

In one embodiment of the invention the silica mixed with the octamethylcyclotetrasiloxane (D4) can be supplied together with the vehicle medium to the fluidized bed and stripped off continuously from the upper part, preferably after having passed through a calming zone. Furthermore, the treatment can be carried out in an internally heated fluidized bed. The heat required can be supplied partly in the form of steam and/or as a hot inert gas. In a manner known per se, the steam and/or the inert gas may be used at the same time for the pneumatic conveying of the reactants.

In the process of the invention, the ratio of dimethyl-silyl to monomethylsilyl groups on the hydrophobed, pyrogenically prepared silica can be controlled by the temperature regime during the hydrophobing procedure.

In one preferred embodiment of the invention the temperature can be varied in a range from 500 to 600° C., and a residence time of 0.5 h±0.2 h may be observed.

The octamethylcyclotetrasiloxane (D4) hydrophobing agent used with preference can be supplied in the form of the vapour.

Any hydrochloric acid still adhering and any excess hydrophobing agent can be removed in a downstream, backed-up countercurrent fluidized bed at temperatures of 250 to 350° C. with a residence time of 0.5 h±0.2 h. The backing-up and hence the degree of filling of the fluid deacidification bed are achieved by throttling of the product discharge valve. The pressure difference between the dome and the base of the fluid bed, which is established by the hydrostatic pressure, can be held at 20 to 40 mm water column by regulating the product discharge valve at the point of discharge from the fluid bed.

The process can be carried out as a countercurrent process or, more judiciously, by a cocurrent process. The dimensions of the fluid bed may be such that the fluidizing suspension of silica and hydrophobing agent migrates continually upward and is able to flow away continuously from the top part of the space, preferably after passing through a calming zone.

Advantageously it is possible, by varying the temperature in the hydrophobing fluid bed, to selectively set the dimethylsilyl-monomethylsilyl ratio of the products obtained.

In the top part of the fluid bed it is possible to take off excess hydrophobing agent which has not been bound chemically to the silica surface.

In the process it is also possible to carry out the hydrophobing and deacidification in an apparatus utilized jointly. In that case this apparatus can have a design such that the hydrophobing can be carried out in cocurrent (inner jacket) and the deacidification in countercurrent (outer jacket).

The process can advantageously be carried out immediately after the preparation process for pyrogenic oxides. In the continuous process of the invention, there is no need to add acids or bases, which are typically used as a catalyst in the hydrosilylation reaction, if the hydrophobing is carried out on non-deacidified, pyrogenically prepared silicas.

Through the coupling of the process steps of silica preparation with the directly attached silylation reaction (hydrophobing) it is possible to obtain products with very low fractions of acidic by-products.

Since there are no acidic by-products formed, such as HCl, for example, there is also inhibition in the reaction of the free silanol groups with non-halogenated siloxanes, in accordance with Le Chatelier's principle. The more rapid, optimized reaction rate which results from this also allows the hydrophobing of pyrogenically prepared silicas of high surface area, in contrast to the known process.

Table 1 below shows the properties of the pyrogenic silicas used as starting substances for the silanization with cyclic polysiloxanes.

TABLE 1

| Properties of pyrogenic silicas prior to silanization | | | | | | | | |
|---|---|---|---|---|---|---|---|---|
| | Aerosil 90 | Aerosil 130 | Aerosil 150 | Aerosil 200 | Aerosil 300 | Aerosil 380 | Aerosil OX 50 | Aerosil TT 600 |
| Attitude towards water | hydrophilic | | | | | | | |
| Appearance | loose white powder | | | | | | | |
| BET surface area[1] $m^2/g$ | 90 ± 15 | 130 ± 25 | 150 ± 15 | 200 ± 25 | 300 ± 30 | 380 ± 30 | 50 ± 15 | 200 ± 50 |
| Average primary particle size nm | 20 | 16 | 14 | 12 | 7 | 7 | 40 | 40 |
| Tapped density[2] | | | | | | | | |
| normal product g/l | about 80 | about 50 | about 50 | about 50 | about 50 | about 50 | about 130 | about 60 |
| compacted product (suffix "V") g/l | — | about 120 | about 120 | about 120 | about 120 | about 120 | — | — |
| Loss on drying[3] (2 hours at 105° C.) on leaving the supply plant % | <1.0 | <1.5 | <0.5[10] | <1.5 | <1.5 | <2.0 | <1.5 | <2.5 |
| Loss on ignition[4][8] (2 hours at 1000° C.) % | <1 | <1 | <1 | <1 | <2 | <2.5 | <1 | <2.5 |
| pH[5] (in 4% aqueous dispersion) | 3.6-4.5 | 3.6-4.3 | 3.6-4.3 | 3.6-4.3 | 3.6-4.3 | 3.6-4.3 | 3.8-4.8 | 3.6-4.5 |
| $SiO_2$[8] % | >99.8 | >99.8 | >99.8 | >99.8 | >99.8 | >99.8 | >99.8 | >99.8 |
| $Al_2O_3$[8] % | <0.05 | <0.05 | <0.05 | <0.05 | <0.05 | <0.05 | <0.08 | <0.05 |
| $Fe_2O_3$[8] % | <0.003 | <0.003 | <0.003 | <0.003 | <0.003 | <0.003 | <0.01 | <0.003 |
| $TiO_2$[8] % | <0.03 | <0.03 | <0.03 | <0.03 | <0.03 | <0.03 | <0.03 | <0.03 |
| HCl[8][9] % | <0.025 | <0.025 | <0.025 | <0.025 | <0.025 | <0.025 | <0.025 | <0.025 |
| Sieve residue[6] (Mocker method, 45 μm) % | <0.05 | <0.05 | <0.05 | <0.05 | <0.05 | <0.05 | <0.2 | <0.05 |

[1] DIN 66131
[2] DIN ISO 787/XI, JIS K 5101/18 (unsieved)
[3] DIN ISO 787/II, ASTM D 280, JIS K 5101/21
[4] DIN 55 921, ASTM D 1208, JIS K 5101/23
[5] DIN ISO 787/IX, ASTM D 1208, JIS K 5101/24
[6] DIN ISO 787/XVIII, JIS K 5101/20
[7] based on the substance dried at 105° C. for 2 hours
[8] based on the substance calcined at 1000° C. for 2 hours
[9] HCl content is a constituent of the loss on ignition
[10] special packaging providing moisture protection The structural modification of the silicas thus prepared takes place subsequently by means of mechanical action. Structural modification may if appropriate be followed by subsequent grinding. If appropriate, after the structural modification and/or subsequent grinding, a heat treatment may take place.

The structural modification may take place for example with a ball mill or with a continuously operating ball mill. Subsequent grinding may take place, for example, by means of an air-jet mill, toothed-disc mill or pinned-disc mill. Heat treatment may take place batchwise, in a drying oven, for example, or continuously, in a fluid bed or fluidized bed, for example. Heat treatment may take place under inert gas, nitrogen for example.

In one preferred embodiment the structurally modified, pyrogenically prepared silicas possess the following physicochemical properties:

BET specific surface area [$m^2/g$] measured in accordance with DIN 66131: 100 to 300, preferably 115 to 290, very preferably 125 to 280 $m^2/g$.

Tapped density measured in accordance with DIN ISO 787/XI, JISK 5101/18 (unsieved): 110 to 290, preferably 120 to 280, more preferably 130 to 270 g/l.

Loss on drying in accordance with DIN ISO 787/II, ASTM D 280, JISK 5101/21: 0.01% to 2%, preferably 0.05% to 1.5%, more preferably 0.09% to 1.2%.

pH: 3 to 7.5, preferably 3.5 to 6, more preferably 3.5 to 5.5.

Carbon content: 0.1% to 5%, preferably 0.5% to 4%, more preferably 1.0% to 3.0%.

The structurally modified, pyrogenically prepared silicas of the invention silanized with cyclic polysiloxanes and structurally modified are suitable more particularly for use in adhesives.

The invention accordingly further provides adhesives which comprise the structurally modified silicas of the invention.

An adhesive is defined as a non-metallic material which is able to join adherends by surface adhesion and internal strength (cohesion). In the prior art there are numerous different adhesives known, the great majority of the adhesives used having a composition based on organic compounds. A distinction is made essentially between physically setting adhesives and chemically curing adhesives. The physically setting adhesives are those in which the final adhesive substance, frequently a polymer, is used as it is and then a physical process causes the adhesive to solidify.

Known accordingly, for example, are hotmelt adhesives, dispersion-based adhesives, wet adhesives containing organic solvents, and contact adhesives. A feature common to all of these types of adhesive is that first the adhesive is applied in a processable form and then solidification occurs as a result, for example, of evaporation of the solvent or of cooling.

In the case of chemically curing adhesives, individual building blocks are applied and subsequently, by means of a chemical reaction of the individual building blocks, a new product is formed and undergoes solidification. Among the reactive adhesives a distinction is made between 2-component and 1-component systems. In the case of the 2-component systems, the adhesives are applied from separate constituents and solidify through a chemical reaction. In the case of 1-component adhesives, the adhesive cures in a chemical reaction, as a result of a change in the ambient conditions—for example, temperature increase, ingress of air, evaporation, moisture or atmospheric oxygen.

The group of the chemically curing adhesives includes, for example, cyanoacrylate adhesives, methyl meth-acrylate adhesives, anaerobically curing adhesives, radiation-curing adhesives, phenol-formaldehyde resin adhesives, silicones, silane-crosslinked polymer adhesives, polyimide adhesives, epoxy resin adhesives and polyurethane adhesives. An overview of the various adhesives can be found in Ullmann's Enzyklopädie der Chemie, 4th edition, volume 14, page 227 ff. (1997).

Also known is the use of different additives in adhesives; among others, for example, pyrogenic (fumed) silicas, which are effective thixotropic agents, are used in adhesives based on epoxy resins (Degussa Pigments brochure series (2001) Nos. 27 and 54).

Pyrogenically prepared silicas possessing silanized surfaces are known from the prior art. EP 0 672 731 A1 describes silanized silicas. The silicas described therein are also not structurally modified.

A disadvantage associated with the use of such silicas is that they can be used only at a low concentration, since otherwise the adhesive is thickened to such a great extent that it is no longer possible to ensure processability. This means that only small amounts of pyrogenic silicas can be used in the adhesives, and, therefore, the desired thixotropic effect is not adequately ensured.

This disadvantage is particularly significant when the aim is to achieve high levels of filling in the adhesives in order to improve properties, such as fracture toughness, impact strength, scratch and abrasion resistance, contraction characteristics, thermal expansion and thermal stability of the adhesive. In that situation it is only possible to add insufficient amounts of pyrogenic silicas, since the adhesive becomes too thick and can therefore no longer be processed.

A further technical problem addressed by the invention is therefore that of providing adhesives into which fairly large amounts of pyrogenic silica can be incorporated, for the purpose of improving the rheological properties, without thickening of the adhesive occurring, and with the adhesive remaining processable.

This technical problem is solved by means of an adhesive which comprises the structurally modified, pyrogenically prepared silicas according to the invention.

Silanized silicas are known from the prior-art DE 102 39 424 A1, where they are used in coating materials in order to improve the scratch resistance of the coating's surface. EP 0 672 731 A1 likewise discloses silanized pyrogenic silicas, but those silicas are not structurally modified and are used as thickeners for coating materials and resins.

It has surprisingly been observed that the structurally modified, pyrogenically prepared silicas according to the invention do not cause any thickening in adhesives, contrary to the prior art described in EP 0 672 731 A1, but instead can be introduced in fairly large amounts into adhesive without a strongly thickening effect occurring. It has been found that it is more particularly the structural modification, in conjunction with the specific silanized groups, that is responsible for this effect being obtained.

Pyrogenically prepared silicas are typically prepared by means of high-temperature hydrolysis from silicon tetrachloride, hydrogen and oxygen. For the adhesives of the invention, silicas are used which are prepared by temperature hydrolysis and have the physicochemical data shown in Table 1. Pyrogenic silicas of this kind are known from, for example, DE 102 39 424 A1. Pyrogenic silicas are also described in Winnacker-Küchler, Chemische Technologie, volume 3 (1983), 4th edition, page 77 and in Ullmann's Enzyklopädie der technischen Chemie, 4th edition (1982), volume 21, page 462 ff.

The adhesives preferentially contain 1% to 40%, preferably 2% to 30%, more preferably 4% to 10% by weight of the structurally modified, pyrogenically prepared silicas.

In one preferred embodiment the adhesive of the invention contains 1% to 40%, preferably 2% to 30% and more preferably 4% to 10% by weight of the structurally modified, pyrogenically prepared silica.

In one preferred embodiment the adhesive comprises as its base polymer compounds selected from the group consisting of epoxy resins, unsaturated polyester resins, polyurethane, silane-terminated polymers, vinyl ester resins, acrylates, polyvinyl acetate, polyvinyl alcohol, polyvinyl ethers, ethylene-vinyl acetate, ethylene-acrylic acid copolymers, polyvinyl acetates, polystyrene, polyvinyl chloride, styrene-butadiene rubber, chloroprene rubber, nitrile rubber, butyl rubber, polysulphide, polyethylene, polypropylene, fluorinated hydrocarbons, polyamides, saturated poly-esters and copolyesters, phenol-formaldehyde resins, cresol-/resorcinol-formaldehyde resins, urea-formaldehyde resins, melamine-formaldehyde resins, polyimides, polybenzimidazoles, polysulphones or mixtures thereof.

In one preferred embodiment the structurally modified, pyrogenically prepared silica can also be introduced into an epoxy resin, with this resin then being admixed to the adhesive.

Adhesives are products which, in accordance with their respective chemical composition and the physical state prevailing at the time of application to the adherends, allow wetting of the surfaces and, in their bonded joint, form the adhesive layer needed for the transmission of force between the adherends. Like sealants, adhesives comprise similar components in addition to the base polymer, such as, for example, solvents (ketones for example), water, fillers (chalk for example), thixotropic agents (pyrogenic silica for example), adhesion promoters (silanes for example), colour pastes (pigment-grade carbon black for example) and also further additives (for example, catalysts, ageing inhibitors).

In comparison to sealants, adhesives have higher tensile shear strengths and lower extension values; in other words, adhesives are hard to elastic, and sealants are elastic to plastic.

Epoxy resins are used preferably as base polymers for adhesives. Epoxy resins are prepared for example by condensing 2,2-bis(4-hydroxyphenyl)propane and epi-chlorohydrin in a basic medium. Depending on the equivalents of both reactants that are employed, the products are glycidyl ethers with different molar masses. In recent years, epoxy resins from bisphenol F, novolak epoxy resins, and cycloaliphatic and hetero-cyclic epoxy resins have also acquired importance.

Since epoxy resins on their own are poor film formers, molecular enlargement is required by means of suitable crosslinking agents. Examples of crosslinking agents used for epoxy resins include polyamines, polyamino-amides, carboxylic anhydrides and dicyandiamides. Among the amine curing agents a distinction is made between aliphatic, cycloaliphatic, aromatic and araliphatic polyamines. Curing takes place without elimination of reaction products. It generally involves the addition of a reactive hydrogen atom to the epoxide group, with formation of a hydroxyl group.

Unsaturated polyester resins are used preferably as base polymers for adhesives. They are obtained by polycondensation of unsaturated and saturated dicarboxylic or polycarboxylic acids with alcohols. Given a suitable reaction regime, the double bonds remain in the acid and/or alcohol and permit polymerization reactions with unsaturated monomers, styrene for example. Unsaturated dicarboxylic acids used with preference are as follows: maleic anhydride, maleic acid, fumaric acid.

Saturated dicarboxylic acids used with preference are as follows: ortho-phthalic acid and ortho-phthalic anhydride, isophthalic acid, terephthalic acid, tetrahydrophthalic acid, hexahydrophthalic acid, adipic acid, azelaic acid, sebacic acid, hexachloroendomethylenetetrahydrophthalic acid, tetrabromophthalic acid.

Glycols used with preference are as follows: propylene 1,2-glycol, ethylene glycol, butylene glycol, neopentyl glycol, 2,2,4-trimethylpentane-1,3-diol, dibromoneopentyl glycol, diethylene glycol, triethylene glycol, dipropylene glycol, pentaerythritol diallyl ether, dicyclopentadiene.

Monomers for the crosslinking used with preference are as follows: styrene, alpha-methylstyrene, meta- and para-methylstyrene, methyl methacrylate, diallyl phthalate, triallyl cyanurate.

This listing does not exhaust the number of possible starting materials. The skilled person will be able, depending on the raw material situation, to use other compounds as well. Furthermore, the addition of dicyclopentadiene is customary, and the reactivity of the resins is modified as a result. The "unsaturated polyester resins" produced can be used as such or in dilution with reactive monomers. Reactive monomers are styrene, stilbene, esters of acrylic acid, esters of methacrylic acid, diallyl phthalate, and other unsaturated compounds, provided that they have a sufficiently low viscosity and adequate miscibility with the unsaturated polyester resin.

Polyurethane resins are used preferably as base polymers for adhesives. The polyurethanes are derived from isocyanic acid. As an extremely reactive compound, it undergoes addition very readily with compounds which possess an active hydrogen atom. In the course of this reaction the double bond between the nitrogen and the carbon is cleaved, the active hydrogen becoming attached to the nitrogen and the oxygen-combining radical to the carbon, to form a urethane group. In order to obtain higher molecular mass crosslinked polyurethanes of the kind needed for adhesive and sealant layers, it is necessary to provide reaction partners which are starting products having at least two functional groups, such as di- or triisocyanates, for example diphenylmethane 4,4-diisocyanate (MDI) with polymeric fractions, or reaction product of tolylene diisocyanate (TDI) and polyols, and polyhydric alcohols (diols or polyols, compounds having two or more hydroxyl functions in the molecule). Alcohols of this kind may also be present, for example, in the form of saturated polyesters, which are prepared with an excess of polyalcohols.

Two-component reactive adhesives are composed of a low molecular mass polyisocyanate and a likewise relatively low molecular mass polyesterpolyol, for example poly-alkylene polyadipate. Following the combining of the two components, urethane groups are formed in the adhesive or in the adhesive layer.

One-component reactive adhesives are composed of a relatively high molecular mass polyurethane, which sets by reacting with atmospheric moisture. In principle the situation here as well is one of two inter-reacting chemical components, but only one physical component is supplied for adhesive processing. Since, on reaction with moisture, the simple low molecular mass polyisocyanates form relatively hard and brittle adhesive layers with low strength values, the one-component systems start from precrosslinked polymers, known as prepolymers. These compounds are prepared from relatively high molecular mass polyols with a stoichiometric excess of isocyanate. In this way, the compounds present already possess urethane bonds, but in addition possess reactive isocyanate groups as well, which are amenable to the reaction with moisture. The reaction with water proceeds with the formation of a urea bond. The primary amines formed in the course of the decomposition reaction react immediately with further isocyanate groups to form polyureas. In the case of the one-component systems, therefore, the fully cured polymer contains not only urethane compounds but also urea compounds.

Solvent-borne polyurethane adhesives are available as physically setting systems and as chemically reacting systems. In the case of the physically setting systems the polymer takes the form of a high molecular mass hydroxyl polyurethane, the solvent used being, for example, methyl ethyl ketone. The chemically reacting systems include additionally hydroxyl polyurethane, a further polyisocyanate as crosslinker and as a second component.

Dispersion-based adhesives comprise a high molecular mass polyurethane in dispersion in water.

In the case of thermally activable polyurethane adhesives the isocyanate component is in "capped" or "blocked" form in a compound which eliminates the isocyanate component only at a relatively high temperature.

Reactive polyurethane hotmelt adhesives are prepared by using relatively high molecular mass, crystallizing and meltable diol and isocyanate components. These components are applied as hotmelt adhesives at temperatures from around 70° C. to 120° C. to the adherends. After cooling, the bond acquires a sufficient initial strength, which allows rapid further processing. Subsequently, as a result of additional moisture exposure of the reactive isocyanate groups still present, crosslinking then takes place via urea bonds, to form the adhesive layer polymer.

Silane-terminated polymers are used preferably as base polymers for adhesives.

The term "silane-terminated polymers" or else "silane-modified polymers" embraces all of those prepolymers which, either at the chain ends or pendently, carry silyl groups having at least one hydrolysable bond, but whose polymer backbone does not contain the siloxane bond typical of siloxanes.

In general it can be assumed that any silane-modified polymer, irrespective of its chemical structure, will have the qualities of a hybrid: the curing is similar to that of the silicones, and the other properties are shaped by the various possible polymer backbones between the silyl groups. Silane-terminated or silane-modified polymers can be classed in terms of their structure between the polyurethanes and the silicones.

The synthesis of the silane-modified polymer encompasses a number of stages. The initial basis is dihydric or trihydric polyoxypropylene glycol, which is converted into the corresponding bisallyl compound. That compound is reacted to form the desired end product, bis(3-(methyldimethoxysilyl)propyl)polyoxy-propylene.

The silyl groups thereby introduced into the chains crosslink with one another via mechanisms of the kind known in silicone chemistry, i.e., with elimination of small amounts of water or methanol, and so give an elastic and insoluble network.

There are further possible methods of obtaining sealants and adhesives based on silicone-modified polymers: for example, the reaction of NCO-terminated prepolymers with correspondingly reactive aminosilanes or mercaptosilanes. The polymer backbone may contain all of the conceivable rational structural elements, such as ether, ester, thioether or disulphide bridges. The converse case, in which an $NH_2$-, SH- or OH-terminated prepolymer can be reacted with an isocyanate silane, is likewise conceivable. The addition of terminal mercapto groups either in the prepolymer or in the silane to C—C double bonds offers a further route of technical interest.

Vinyl ester resins are used preferably as base polymers for adhesives. On the chemical side, vinyl ester resins possess a certain relationship to the UP resins, in particular as far as curing reaction, processing technology and field of use are concerned. The resins are in this instance polyadducts of liquid epoxy resins and acrylic acid. As a result of reduction of ester groups in the molecule chain, these resins have better hydrolysis resistance in tandem with effective elasticity and impact toughness. Monomers used for crosslinking are the same as for the unsaturated polyester resins, styrene in particular.

Acrylates are used preferably as base polymers for adhesives. The collective term "acrylate-based adhesives" encompasses all of the reactive adhesives whose curing takes place via the carbon-carbon double bond of the acrylic group.

Particular significance in adhesive formulations has been acquired by the methacrylic esters and the alpha-cyanoacrylic esters. The curing of the acrylate adhesives is accomplished by addition polymerization, in the course of which an initiator triggers a chain reaction leading to a continuous curing of adhesive. The polymerization of the "acrylate" adhesives can be initiated by means of free radicals or alternatively, in the case of the alpha-cyanoacrylates, by means of anions. In accordance with the polymerization mechanism that is utilized for curing, the acrylate adhesives are also subdivided into the following groups:

anionically curing adhesives: alpha-cyanoacrylate 1-component adhesives, free-radically curing adhesives: anaerobic 1-component adhesives, free-radically curing adhesives: 2-component adhesives In the case of the sealants based on polyacrylic esters or acrylic ester copolymers and polymethacrylic esters a distinction is made between solvent-borne and aqueous systems. Polyacrylate sealants cure physically by evaporation of the solvent or of the dispersion water.

Polyvinyl acetates are used preferably as base polymers for adhesives. Polyvinyl acetate is the product of polymerization of vinyl acetate. Owing to the strongly polar acetate group present in the molecule, polyvinyl acetate possesses very good adhesion properties to many adhered surfaces. Use is predominantly as a dispersion-based adhesive with a solids content of approximately 50% to 60%, in some cases also based on vinyl acetate copolymers (with vinyl chloride, for example).

Polyvinyl alcohols are used preferably as base polymers for adhesives.

Polyvinyl alcohol comes about as a product of hydrolysis of polyvinyl acetate and other similar polyesters. Depending on molecular weight, the polyvinyl alcohol takes the form of a liquid having a more or less high viscosity. It is used, for example, for bonding cellulosic materials, such as paper, cardboard, wood, etc., for example, and also as a protective colloid for stabilizing and increasing the setting rate of dispersion-based adhesives.

Polyvinyl ethers are used preferably as base polymers for adhesives. Among the polyvinyl ethers, the following three polymers in particular are of interest as base materials for adhesives: polyvinyl methyl ethers, polyvinyl ethyl ethers, polyvinyl isobutyl ethers The polyvinyl ethers at moderate degrees of polymerization are tacky plasticizing resins possessed of very good adhesion properties to porous and smooth surfaces. Polyvinyl methyl ether is notable in particular for the fact that, owing to its water-solubility, it can be moistened again and therefore, for example, as a mixture with dextrin or animal glues, used as a gum on label papers, endows them with improved adhesion. On account of their permanent tackiness, polyvinyl ethers are also employed in pressure-sensitive adhesives.

Ethylene-vinyl acetates, a copolymer of ethylene and vinyl acetate, are used preferably as base polymers for adhesives. In the molecular structure the vinyl acetate molecules are incorporated randomly in the ethylene chain. While the elimination of acetic acid makes the polyvinyl acetate relatively unstable with respect to temperature load, the copolymers with ethylene are significantly more resistant in terms of oxidation and thermal degradation. For this reason, EVA copolymers with an approximately 40% vinyl acetate fraction are among an important group of base hotmelt adhesive materials.

Ethylene-acrylic acid copolymers are used preferably as base polymers for adhesives. They are copolymers of ethylene and of acrylic acid and/or acrylic esters.

These copolymers, which combine the chemical resistance of polyethylene with the good properties of the acid and/or ester moiety, represent important base polymers for hotmelt adhesives. The ester component used is preferably ethyl acrylate.

Polyvinylacetals are used preferably as base polymers for adhesives. Polyvinylacetals come about through the action of aldehydes on alcohols. The most important acetals for adhesives manufacture are polyvinylformal and polyvinylbutyral. Both serve as a plasticizing component for phenolic resin-based adhesives. Polyvinylbutyral, moreover, finds application as an adhesive film in laminated safety glass.

Polystyrenes are used preferably as base polymers for adhesives. The monomer is in use as a constituent for adhesive base materials predominantly in two areas: as a copolymer with plasticizing monomers, particularly butadiene, for the preparation of styrene-butadiene dispersions; and as a "polymerizable" solvent for copolymerization with unsaturated polyesters.

Polyvinyl chlorides are used preferably as base polymers for adhesives. They are used more particularly for plastisol adhesives, and also as a copolymer with vinyl acetate to give vinyl chloride/vinyl acetate copolymers in solvent-based adhesives, dispersion-based adhesives, heat-sealing adhesives, and as a high-frequency welding assistant.

Styrene-butadiene rubber is used preferably as base polymer for adhesives. Styrene-butadiene rubber is a typical example of a thermoplastic elastomer, combining the application properties of elastomers with those of thermoplastics. The styrene-butadiene copolymer (SBS) and the styrene-isoprene copolymer (SIS) are what are called triblock copolymers, constructed linearly of successive identical monomer units in individual blocks. The end blocks are polystyrene segments, while the middle block is polybutadiene (styrene-butadiene-styrene block copolymer, SBS) or else isoprene (styrene-isoprene-styrene block polymer, SIS).

The ratio of styrene fraction to butadiene fraction or of styrene fraction to isoprene fraction is approximately 1:3. Unlike adhesive layer polymers which owe their elastic properties to the addition of plasticizer, in this way an "internal plasticizing" is achieved. A particular advantage of these rubber copolymers is their ability to form adhesive layers having good adhesion properties and high flexibility. Significant application therefore exists in situations where the adhesively bonded adherends are subject in practical use to high deformation stresses, such as in footwear or with rubber/rubber or rubber/metal bonds, for example.

Chloroprene rubber (CR) is used preferably as base polymer for adhesives. Chloroprene rubber comes about as a polymerization product and copolymerization product of chloroprene (2-chlorobutadiene). Besides the good adhesion properties, the linear macromolecules possess a strong propensity towards crystallization, which contributes to a relatively high strength on the part of the adhesive layer. These polymers and copolymers are important base materials for contact adhesives. The double bond present within the polychloroprene molecule allows additional crosslinking to be carried out with correspondingly reactive molecule groups. Thermosetting components used for this purpose include isocyanates and phenolic resins.

Nitrile rubber (NBR) is used preferably as base polymer for adhesives. Nitrile rubber is a copolymer of butadiene with a fraction of approximately 20% to 40% of acrylonitrile. The high acrylonitrile fraction endows these polymers with effective plasticizer resistance, thus making them highly suitable, for example, for the bonding of plasticized plastics.

Butyl rubber is used preferably as base polymer for adhesives. Butyl rubber is a copolymer composed of a predominant fraction of isobutylene with isoprene. Within this linear chain molecule there exist, in the form of the long polyisobutylene segments, very high chain fractions of saturated character, at which no further crosslinking is possible. The sole crosslinkable component is the isoprene molecule, and so the overall properties of the butyl rubber are determined by the fraction of the number of double bonds, predetermined by the isoprene. The reactivity can be further influenced by incorporation of monomers containing chlorine or bromine.

Polysulphides are used preferably as base polymers for adhesives. Raw materials for polysulphide sealants have long been known under the trade name Thiokol®. Polysulphide polymers are obtained by reacting dichloroethylformal with sodium polysulphide. The molecular weight of the liquid polymers is between 3000 and 4000. By reaction with an oxidizing agent, manganese dioxide for example, they can be converted into an ultimate rubber-elastic state.

Polyethylenes are used preferably as base polymers for adhesives. The low molecular mass types, with melt indices in the range from 2 to 2000 g/10 min, have found use, in combination with tackifying resins and microwaxes, as hotmelt adhesives in the paper and cardboard industry.

Polypropylenes are used preferably as base polymers for adhesives. Polypropylene is in use as a base material for hotmelt adhesives with moderate strength properties, more specifically in the form of atactic polypropylene.

Fluorinated hydrocarbons are used preferably as base polymers for adhesives. Polyfluoro-ethylene-propylene is a copolymer of tetrafluoroethylene and hexafluoro-propylene and has been studied as a base material for hotmelt adhesives. The advantage of these products lies in the high long-term temperature durability.

Polyamides are used preferably as base polymers for adhesives. The polyamides represent some of the most important base materials for the physically setting hotmelt adhesives. Suitable for the preparation of the polyamides are the reactions described below, which typically take place in the melt under a nitrogen atmosphere: polycondensation of diamines with dicarboxylic acids; polycondensation of aminocarboxylic acids; polycondensation from lactams; polycondensation of diamines with dimerized fatty acids.

Saturated polyesters and copolyesters are used preferably as base polymers for adhesives. Saturated polyesters and copolyesters come about through polycondensation from dicarboxylic acids and diols. They are an important base material for hotmelt adhesives.

Phenol-formaldehyde resins are used preferably as base polymers for adhesives. These polymers come about through a polycondensation reaction between phenol and formaldehyde, forming highly crosslinked phenolic resins which are used as a base material for adhesives for—for example—aircraft construction. Pure phenol-formaldehyde resins are generally too brittle. For this reason they are modified with thermoplastic polymers by copolymerization or cocondensation, for example with polyvinylformal, polyvinylbutyral, polyamides, epoxy resins or elastomers, for example polychloroprene and nitrile rubber.

Cresol-/resorcinol-formaldehyde resins are used preferably as base polymers for adhesives. Besides phenol as a starting monomer for formaldehyde condensations, use is also made of phenol derivatives, such as cresols and resorcinol, as co-reactants.

Urea-formaldehyde resins are used preferably as base polymers for adhesives. A large number of nitrogen-containing organic compounds are capable of polycondensation with aldehydes. For application as adhesives, urea and melamine in particular have acquired importance. With the urea-formaldehyde resins the reaction sequence takes place initially in the form of an addition reaction in weakly acidic solution. The actual polycondensation reaction, leading to the formation of the polymeric adhesive layer, results in highly crosslinked polymers via the formation either of an ether bridge or of a methylene bridge.

Melamine-formaldehyde resins are used preferably as base polymers for adhesives. Like urea, melamine as well reacts with formaldehyde to form methylol compounds. As in the case of the urea reactions, the polycondensation with these compounds too proceeds via methylene or methylene ether linkages to form high molecular mass, highly crosslinked, hard and in some cases brittle adhesive layers.

Polyimides are used preferably as base polymers for adhesives. The experiments on the use of the polyimides arise out of the concern to have organically based adhesives available for high temperature challenges. The preparation of technically utilizable polyimides is accomplished by reaction of the anhydrides of tetra-basic acids, for example pyromellitic anhydride, with aromatic diamines, for example diaminodiphenyl oxide. Use as an adhesive is accomplished starting from a precondensate, in the form of solutions or films.

Polybenzimidazoles are used preferably as base polymers for adhesives.

The polybenzimidazoles are likewise to be classed as adhesives of high heat resistance. They come about through a polycondensation reaction from aromatic tetramines with dicarboxylic acid.

Polysulphones are used preferably as base polymers for adhesives. The polysulphones likewise belong to the group of heat-resistant adhesives. They are obtained, for example, through a polycondensation reaction from dihydroxydiphenyl sulphone with bisphenol A.

The adhesives of the invention are used preferably in casting compounds, which are used as a coating in the electrical and electronics industries.

It was surprising that the silicas described could be incorporated more rapidly into the adhesives of the invention and, despite high levels of filling, there were no disadvantages observed in respect of the viscosity and the processability of the adhesives.

The examples which follow are intended to elucidate the invention in greater detail.

EXAMPLES

Example 1

Preparation of the Silanized Silicas 1

The hydrophobic silica 1 (based on pyrogenically prepared silica Aerosil 200 from Table 1) is prepared fully continuously in accordance with DE-B 11 63 784.

The Aerosil 200 or Aerosil 300 silica produced by the pyrogenic route is mixed intensively in an injector in the same unit—without prior deacidification and interim storage—with octamethylcyclotetrasiloxane vapour (D4) and supplied to a cocurrent fluid bed which has been rendered inert using nitrogen.

By treatment with steam at a temperature of 500-600° C. with a residence time of 0.5 h in the fluidized bed, octamethylcyclotetrasiloxane (D4) is attached chemically to the Aerosil's surface. By varying the temperature in the fluid bed it is possible to control the dimethylsilyl/monomethylsilyl ratio of the surface groups. Hydrochloric acid still adhering and also excess octamethylcyclotetrasiloxane are removed in a downstream, backed-up countercurrent fluid bed at temperatures of 250 to 350° C. (residence time about 0.5 h). The backing-up and hence the level of filling of the fluid deacidification bed are achieved by throttling of the product discharge valve. The pressure difference which is established between the dome and the base of the fluid bed, as a result of the hydrostatic pressure of the pyrogenic silica, is held at 20 to 40 mm water column (WC) by automatic regulation of the discharge valve at the point of discharge from the fluid bed. The dimethylsilyl to monomethylsilyl ratio is 70:30 for both hydrophobic silicas.

Example 2

Preparation of the Silanized Silicas 2

The process is carried out in accordance with Example 1 using Aerosil 300 from Table 1 as the starting product. In the production process, however, there is an intermediate bunker located between the fluid hydrophobing bed and the fluid deacidification bed.

Table 2 below contains the process parameters for the preparation of silicas 1 and 2.

TABLE 2

|  | Silica 1 | Silica 2 |
| --- | --- | --- |
| Aerosil 200 | 106 kg/h |  |
| Aerosil 300 |  | 106 kg/h |
| Temperature of D4 | 177° C. | 170-175° C. |
| Amount of D4 | 14.5 kg/h | 15.5 kg/h |
| Injection of D4 | 10 m³/h | 10 m³/h |
| N₂ loading of fluid-bed reactor | 6 m³/h | 6 m³/h |
| Amount of water | 5 kg/h | 7 kg/h |
| Fluid-bed reactor top temperature | 540-570° C. | 550-580° C. |
| Fluid-bed reactor bottom temperature | 300° C. | 350° C. |
| Temperature of outgoing gas | about 260° C. | 00about 260° C. |

Table 3 below contains the physicochemical parameters of the silica after silanization and prior to structural modification.

TABLE 3

| Properties | Silica 1 | Silica 2 |
|---|---|---|
| Attitude towards water | hydrophobic | hydrophobic |
| BET surface area m²/g[1] | 150 ± 25 | 250 ± 30 |
| Average primary particle size [nm] | 12 | 7 |
| Loss on drying [%][3] | <0.1 | <0.3 |
| Tapped density [g/l][2] | about 50 | about 50 |
| pH (4% in water)[5] | >4.0 | >3.7 |
| Carbon content [%] | 1.0-2.0 | 1.5-3.0 |
| Ratio of dimethylsilyl/monomethylsilyl groups [%] | 50/50 to 100/0 | 50/50 to 100/0 |
| $SiO_2$ [%] | <99.8 | <99.8 |
| $Al_2O_3$ [%] | <0.05 | <0.05 |
| $FeO_3$ [%] | <0.01 | <0.01 |
| $TiO_2$ [%] | <0.03 | <0.03 |
| HCl [%] | <0.02 | <0.025 |

[1] DIN 66131
[2] DIN ISO 787/XI, JIS K 5101/18 (unsieved)
[3] DIN ISO 787/II, ASTM D 280, JIS K 5101/21
4) DIN 55 921, ASTM D 1208, JIS K 5101/23
[5] DIN ISO 787/IX, ASTM D 1208, JIS K 5101/24
6) based on the substance dried at 105° C. for 2 hours The methanol wettability of silicas 1 and 2 is
for silica 1 40% to >45%
for silica 2 35% to >40%

Example 3

Preparation of the Structurally Modified Silanized Silicas

The structural modification of the silanized silicas is accomplished by mechanical action in a continuously operating ball mill with optional subsequent grinding. Grinding may also be followed by heat treatment. Subsequent grinding is accomplished by means of an air-jet mill, toothed-disc mill or pinned-disc mill. Heat treatment takes place batchwise in a drying oven or may take place continuously in a fluid-bed or fluidized-bed dryer. Table 4 below shows the reaction conditions of the individual silicas used from Table 1. Table 5 shows the physicochemical data of the structurally modified silanized silica.

TABLE 4

Preparation of the structurally modified silicas

| Example | Starting material | Structural modification | Subsequent grinding** | Subsequent heat treatment 2 h at 120° C. |
|---|---|---|---|---|
| 1 | Silica 2 | yes | TM | yes |
| 2 | Silica 1 | yes | AJ | no |
| 3 | Silica 1 | yes | AJ | yes |
| 4 | Silica 2 | yes | PD | no |
| 5 | Silica 1 | yes | no | no |
| 6 | Silica 2 | yes | no | no |

**AJ = air-jet mill, PD = pinned-disc mill, TM = toothed-disc mill

TABLE 5

Physicochemical data of the structurally modified silicas

| Example | BET specific surface area [m²/g][1] | Tapped density [g/l][2] | Loss on drying [%][3,7] | Loss on ignition [%][4,8] | pH | Carbon content [%] |
|---|---|---|---|---|---|---|
| 1 | 221 | 131 | 0.1 | 0.7 | 5.0 | 2.0 |
| 2 | 126 | 194 | 0.6 | 0.9 | 4.8 | 1.3 |
| 3 | 127 | 198 | 0.3 | 0.8 | 4.9 | 1.3 |
| 4 | 226 | 123 | 0.2 | 1.5 | 4.6 | 2.0 |
| 5 | 128 | 268 | 0.9 | 1.0 | 4.9 | 1.3 |
| 6 | 222 | 170 | 0.3 | 1.6 | 4.6 | 2.0 |

[1] DIN 66131
[2] DIN ISO 787/XI, JIS K 5101/18 (unsieved)
[3] DIN ISO 787/II, ASTM D 280, JIS K 5101/21
[4] DIN 55 921, ASTM D 1208, JIS K 5101/23
6) DIN ISO 787/XVIII, JIS K 5101/20
[7] based on the substance dried at 105° C. for 2 hours
[8] based on the substance calcined at 1000° C. for 2 hours Example 4

Rheological Properties

In Example 4 the rheological properties of the structurally modified, pyrogenic silicas used are determined in the epoxy resin Renlam M1 (Huntsman). The respective viscosities with the structurally unmodified silicas SL1 and SL2 from Example 2 and with the structurally modified silicas SL1 and SL2 from Example 3 are ascertained.

The determination of the rheological properties takes place in accordance with the method described below.

167.5 g of Renlam M-1 and 10 g of silica are weighed out into a 350 ml beaker and the dissolver disc is immersed completely. Then the silica is homogenized at a speed n1 of 1000 rpm, with the lid closed, until it has been fully incorporated. As soon as the silica has been fully incorporated, the speed is increased to n2=3000 rpm and dispersion is carried out for 3 minutes under vacuum. The viscosity is determined using a Brookfield DV III rheometer. The viscosity values reported were obtained at room temperature, 25° C. Measurement is made at 2.5 rpm using a no. 7 spindle.

Table 6 below shows the results.

TABLE 6

Rheological properties

| Silica | Viscosity at 25° C. following addition [mPas] | Initial mass of silica [g/% by weight] |
|---|---|---|
| SL1 from Table 2 | 60 800 | 10/5.6 |
| Example 5 from Table 5 | 8320 | 10/5.6 |
| SL2 from Table 2 | 48 000 | 10/5.6 |
| Example 6 from Table 5 | 16 800 | 10/5.6 |

From the table it is apparent that the viscosity of the epoxy resin increases considerably on addition of the comparison silica. In comparison with this, the addition of the structurally modified silicas produces only a slight increase in the viscosity of the epoxy resin. The experiment shows that, even at high levels of filling, the rheological properties of the epoxy resins are not adversely affected and there is no thickening, as a person skilled in the art would have expected from the prior art.

Example 5

Incorporation Behaviour into Polyester Adhesive Resin 100 g of Palatal A 410 (Büfa polyester resin) are weighed out into a 350 ml beaker and conditioned at 25° C. in a water bath. The beaker is inserted into the aluminium insert of the dissolver's mount. The stirrer is immersed to the target level of t=10 mm above the beaker base, and switched on at a speed n of 500 min$^{-1}$. 3 g of silica are placed uniformly on the resin surface, and the stopwatch is started. A measurement is made of the time required for the silica to have become homogenized in the resin.

Table 7 shows the results.

TABLE 7

| Incorporation behaviour | |
|---|---|
| Silica | Incorporation time [sec.] |
| SL 1 from Table 2 | 174 |
| Example 5 from Table 5 | 35 |
| SL 2 from Table 2 | 220 |
| Example 6 from Table 5 | 56 |

The inventive silicas from Examples 5 and 6 can be incorporated very rapidly into Palatal A 410. The comparative examples, in contrast, require a considerably longer time for complete incorporation.

The invention claimed is:

1. A silica comprising:
   a structurally modified silica comprising at least one of a dimethylsilyl group and a monomethylsilyl group on a surface of the structurally modified silica,
   wherein the structurally modified silica is obtained by a process comprising reacting a pyrogenic silica with a cyclic polysiloxane to form silanized silica, and carrying out a subsequent structural modification of the silanized silica,
   the cyclic polysiloxane is represented by a formula, —[O—Si(R$_2$)]$_n$—, where R is a C1 to C6 alkyl group and n is 3 to 9, and the cyclic polysiloxane is reacted with the pyrogenic silica at a temperature in the range of from 350° C. to 600° C., and the temperature is determined based on the ratio of an amount of the dimethylsilyl group to an amount of the monomethylsilyl group on the surface of the structurally modified silica.

2. The silica according to claim 1, wherein the structural modification is grinding.

3. The silica according to claim 2, wherein the structural modification is grinding in a ball mill.

4. The silica according to claim 1, wherein the silica has the following properties:
   a BET specific surface area of from 110 to 280 m$^2$/g,
   a tapped density of from 110 to 290 g/l in accordance with DIN ISO 787/XI,
   a loss on drying of from 0.01 to 2% in accordance with DIN ISO 787/II,
   a loss on ignition of from 0.1 to 4.0% in accordance with DIN 55 921,
   a pH of from 3 to 7, and
   a carbon content of from 0.5 to 4% by weight of said silica.

5. The silica according to claim 1, wherein n in the formula —[O—Si(R$_2$)]$_n$— is 3, 4 or 5.

6. The silica according to claim 1, wherein R is a methyl or ethyl group and n is 3, 4 or 5.

7. The silica according to claim 1, wherein the ratio of the amount of the dimethylsilyl group to the amount of the monomethylsilyl group is 100:0 to 50:50.

8. The silica according to claim 7, wherein the ratio of the amount of the dimethylsilyl group to the amount of the monomethylsilyl group is 100:0 to 70:30.

9. The silica according to claim 1, wherein the structurally modified silica comprises the dimethylsilyl group and the monomethylsilyl group.

10. The silica according to claim 1, wherein the ratio of the amount of the dimethylsilyl group to the amount of the monomethylsilyl group is 70:30 to 50:50.

11. The silica according to claim 1, wherein the ratio of the amount of the dimethylsilyl group to the amount of the monomethylsilyl group is 70:30.

12. The silica according to claim 1, wherein the pyrogenic silica is reacted with the cyclic polysiloxane at a temperature in a range of from 350° C. and 600° C.

13. The silica according to claim 1, wherein the temperature is in a range of from 550° C. to 600° C.

14. The silica according to claim 1, wherein the structurally modified silica has a loss on ignition of from 0.7 to 1.6% in accordance with DIN 55 921.

15. An adhesive comprising the silica according to claim 1.

16. The adhesive according to claim 15, wherein the adhesive comprises the silica of from 1% to 40% by weight of the adhesive.

17. The adhesive according to claim 15, wherein the adhesive comprises a compound selected from the group consisting of epoxy resin, unsaturated polyester resin, polyurethane, silane-terminated polymer, vinyl ester resin, acrylate, polyvinyl acetate, polyvinyl alcohol, polyvinyl ether, ethylene-vinyl acetate, ethylene-acrylic acid copolymer, polyvinyl acetate, polystyrene, polyvinyl chloride, styrene-butadiene rubber, chloroprene rubber, nitrile rubber, butyl rubber, polysulphide, polyethylene, polypropylene, fluorinated hydrocarbon, polyamide, saturated polyester and copolyester, phenol-formaldehyde resin, cresol-/resorcinol-formaldehyde resin, urea-formaldehyde resin, melamine-formaldehyde resin, polyimide, polybenzimidazole, polysulphone or a mixture thereof.

18. The adhesive according to claim 15, comprising a casting compound comprising the silica and an epoxy resin.

19. The adhesive according to claim 15, further comprising a solvent, water, a filler, a thixotropic agent, an adhesion promoter, a colour paste, a catalyst and/or an ageing inhibitor.

20. A casting compound comprising the adhesive according to claim 15.

* * * * *